April 3, 1962     F. T. ROBERTS ET AL     3,028,290
METHOD AND APPARATUS FOR FORMING A REINFORCED CORRUGATED HOSE
Filed Feb. 10, 1959     2 Sheets-Sheet 1
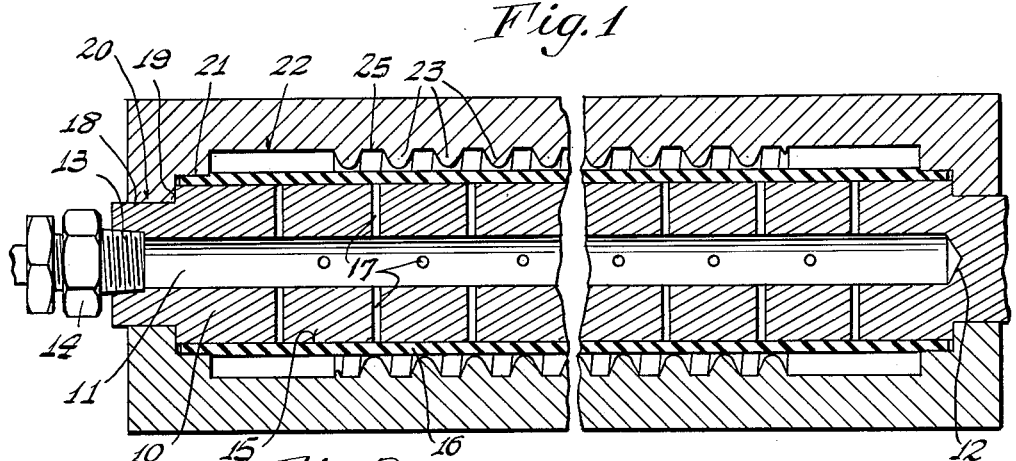
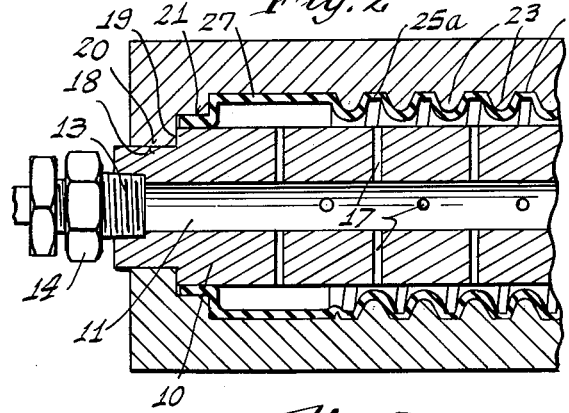 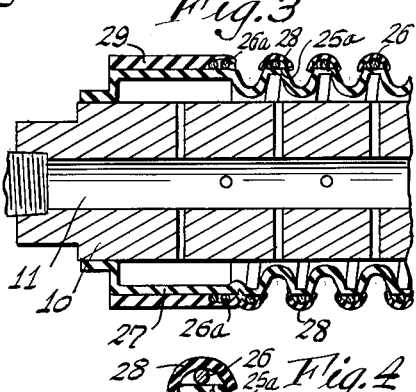
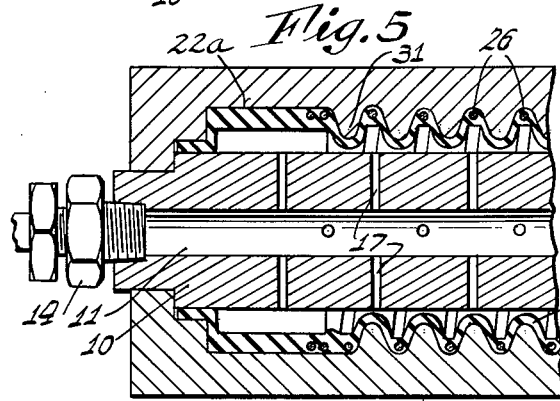 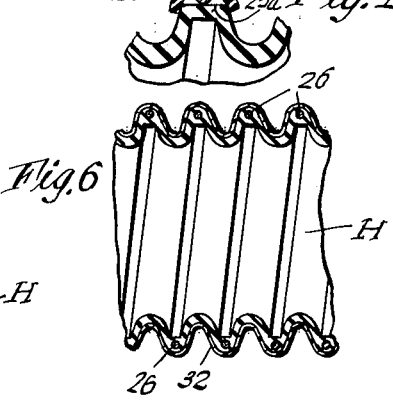 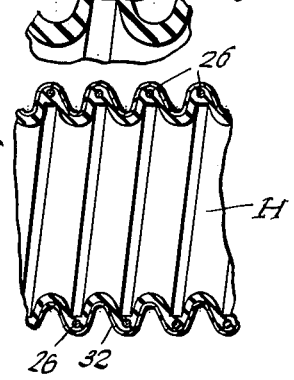
 
INVENTORS
Fred T. Roberts
Robert E. Roberts
BY
Johnson and Kline
ATTORNEYS

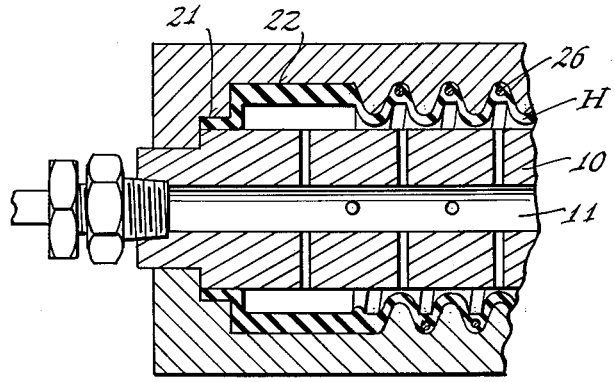
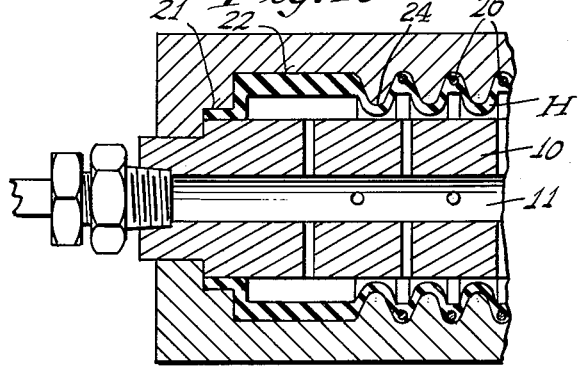
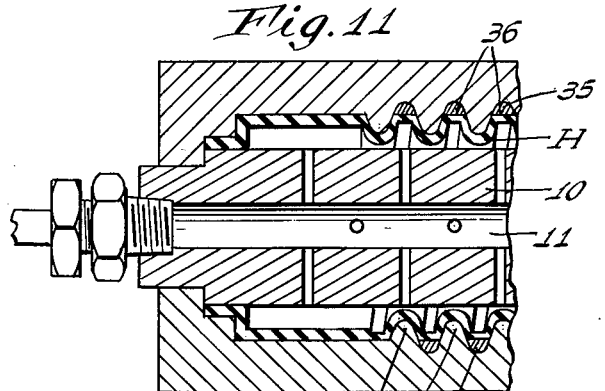

![United States Patent Office]

3,028,290
Patented Apr. 3, 1962

3,028,290
METHOD AND APPARATUS FOR FORMING
A REINFORCED CORRUGATED HOSE
Fred T. Roberts and Robert E. Roberts, both of
Danbury Road, Wilton, Conn.
Filed Feb. 10, 1959, Ser. No. 792,376
13 Claims. (Cl. 156—143)

The present invention relates to an improved method and apparatus for forming a hose.

It is an object of the present invention to provide an improved method of making a hose which is versatile in the make-up of the wall thereof, and preferably one which includes a reinforcing member positioned in predetermined relation to the wall of the hose.

It is a further object of the invention to provide a hose having a corrugated body portion in which reinforcements are disposed and embedded in predetermined relation to the corrugations.

Another object of the invention is to provide an apparatus whereby a hose having predetermined reinforcements therein can be readily and accurately manufactured.

In carrying out these objects the present invention provides for the formation of a body of a hose by molding and partially curing or setting the inner portion of the body of the hose to form a self-sustaining structure and to thereafter apply reinforcing means to the hose and/or corrugations in predetermined relation therewith. The inner portion and/or reinforcing means is covered with material to form the outer portion of the body and is thereafter positioned in a molding cavity and thereafter molded into its final shape. Preferably the hose is made of elastomeric material and in accordance with the present invention the outer portion of the hose can be made from a material compatible to but different from the inner portion of the hose as the use of the hose may require. A feature of the invention resides in the fact that in forming the initial portion of the hose and partially curing it, means can be provided on the hose body whereby the reinforcements can be accurately located, so as to be embedded in predetermined relation to the hose. More particularly, the hose is mounted on a mandrel and inserted in a first mold cavity, the walls of which are shaped to provide a reinforcement-receiving portion on the corrugated part of the hose upon which the reinforements can be positioned and accurately located.

In one specific form of the invention the partially cured inner portion of the hose is provided with reinforcement-receiving portions in the form of flattened crests of the corrugations upon which the reinforcement can be accurately located. Preferably, these flattened crests are of a diameter substantially equal to the internal diameter of the reinforcements so as to engage and accurately position the reinforcements. If desired, the initially shaped crest portions of the partially cured or set hose body can be provided with grooves to receive and hold the reinforcements.

After the reinforcements have been put in position, a strip or layer of fabric and/or compatible elastomeric material is positioned to cover the reinforcements. The body is then inserted in a mold cavity in which the walls are formed with corrugations similar to the first corrugations except that they have fully developed troughs in the corrugations. Internal pressure is applied to the hose and it is completely molded and cured or set to provide finished, smooth, uniformly curved, outer surfaces on the corrugated wall and to embed the reinforcement accurately in the wall of the hose.

The novel apparatus of the present invention controls the two molding operations inasmuch as the mandrel upon which the hose body is initially positioned is provided with means whereby it can be accurately located in the mold with respect to the cavity thereof, thus insuring the accurate position of the hose body during the molding and partial curing and the subsequent molding and final curing of the entire body.

It is to be understood that the mold cavity of the present invention can be formed with fully developed corrugated walls and be provided with fillers during the initial molding operation for forming the reinforcement-receiving portions of the corrugations and which fillers are later removed to form the final shape, or two molds can be used in which the caviiy of one is shaped to provide the partially cured body and the other cavity is shaped to produce the final shape of the hose.

Other features and advantages of the invention will be apparent from the specification and claims when considered in connection with the accompanying drawings in which:

FIGURE 1 shows a longitudinal sectional view of a mandrel having a body thereon and disposed in a mold prior to the molding operation.

FIG. 2 is a fragmentary view, similar to the left end of FIG. 1, showing the material in initial molding position.

FIG. 3 is a view showing the mandrel and partially cured body removed from the mold and with the outer material in position over the reinforcements thereon.

FIG. 4 is an enlarged fragmentary sectional view showing the tape in position over the reinforcement.

FIG. 5 shows a view similar to FIG. 2 showing the molding of the final shape of the hose.

FIG. 6 is a view of a molded hose showing an outer jacket or covering layer formed integrally therewith.

FIG. 7 is a fragmentary sectional view of the mold cavity showing the rib disposed in the trough of the corrugated groove to form the reinforcement-receiving groove in the body.

FIG. 8 is a fragmentary view showing the reinforcement member disposed in the groove.

FIG. 9 shows a view similar to FIG. 5 with the helical reinforcement terminating short of the attaching portion.

FIG. 10 is a view similar to FIG. 5 showing the cavity for forming an annularly grooved hose.

FIG. 11 is a view similar to FIG. 10 showing another form of mold cavity in which a removable insert is positioned in the troughs of the corrugations of the wall.

In accordance with the present invention a mandrel 10 has an axial bore 11 extending therein which is closed at one end at 12 and which is threaded at the other end at 13 to receive a nipple 14 connected to a source of fluid (not shown) under pressure. The mandrel is provided with a smooth outer surface 15 upon which a tube 16 of elastomeric material (such as rubber—natural or synthetic—or thermoplastic resins which may be molded under heat and pressure, for example, polyethylene, polyamides, vinyl polymers, copolymers and the like, the particular requirement of the hose determining the composition thereof) is positioned, which tube may be reinforced with fabric and/or have a stretchable fabric on the outer surface thereof. The mandrel is provided with outwardly extending passages 17 extending from the bore to the surface 15 so that fluid pressure applied to the bore can be exerted on the elastomeric tube as will be described.

At least one end of the mandrel is provided with a flat neck 18 and a shoulder 19 adapted to cooperate with a corresponding opening 20 in the end of the mold to properly and accurately locate the mandrel in the mold.

The mold cavity, as shown in FIG. 1, is provided with end portions 21 which are adapted to grip the end of the elastomeric sleeve to the mandrel to form a seal therewith. There is then provided cylindrical walls 22 extending for a distance required to form the attaching portion of the hose and intermediate the attaching portions of the hose the walls are provided with transversely extending rib means adapted to form the intermediate corrugated wall portion of the hose. The rib means can be a helical rib 23 as shown in FIG. 1 or annular ribs 24 as shown in FIG. 10. As shown in FIG. 1 the wall 25 between the ribs or the trough of the corrugated mold wall is cylindrical, preferably of the same diameter as cylindrical wall 22.

After the mandrel and elastomeric body are in position in the cavity, as shown in FIG. 1, the fluid under pressure, which may be steam or other similar fluid, is fed into the bore and causes the body to be inflated and molded in the manner shown in FIG. 2 so as to provide a hose body H with flattened crests 25a on the corrugations forming reinforcement-receiving portions. The body is retained in the mold and is partially cured or set in this relationship so as to be a self-sustaining body. The mandrel and body thereon are then removed from the mold and a reinforcing member 26, herein illustrated as a continuous helical spring which may or may not be covered with elastomeric material, is positioned on the flat crest of the corrugations and has an internal diameter to engage the outer surface of the molded body and be located by said flattened portion 25a.

In the form of the invention shown in FIG. 3, the end coils 26a of the helical spring are secured to the cylindrical attaching portion 27 of the hose while each coil of spring is accurately positioned centrally on the flat crest of the self-sustaining, partially cured body.

After the reinforcement is in place, a layer or strip 28 of compatible elastomeric material is disposed over the turns of the reinforcing member. In the form of the invention shown in FIG. 3, a band of elastomeric material 29 is positioned to overlie the attaching portion 27 and the end coils 26a and a strip of elastomeric material 28 is positioned over each reinforcement. The mandrel and the assembled body are then put into a second molding cavity the walls of which, as shown in FIG. 5, are provided with a cylindrical surface 22a for molding the attaching portion and have a helically grooved portion 31 similar to the mold of FIG. 1 except that the troughs of the corrugations in the wall have uniform arcs of curvature. The locating means on the mandrel accurately positions the corrugations of the partially cured hose with the reinforcements and tape thereon with respect to the corrugations in the mold so that when pressure is applied to the bore of the mandrel it will cause the body to inflate and be pressed against the walls of the cavity and be accurately molded to form the smooth exterior surface of the hose and accurately embed the reinforcements in position in the crests of the corrugations as shown in FIG. 5.

In some cases it may be desired to provide an outer layer of material 32 over the surface of the hose, such as a wear-resisting layer of plastic or a layer of stockinette, and when this is done prior to the second molding operation, a hose having a wall section such as shown in the fragmentary view of FIG. 6 is provided.

Under some circumstances it may be desired to provide means for holding the reinforcements in position on the partially cured body as in the case where the helical spring does not extend entirely to the attaching portion but is only located on certain of the crests of the corrugations, as shown in FIG. 9, or when annular reinforcements are used, as shown in FIG. 10. In this case the walls of the first mold cavity are provided with a rib 33 on the flattened troughs 25 of the wall corrugations, such as shown in FIG. 7, so that when the hose body is initially molded and partially cured it will provide a groove 34 in the flattened surface for the reception of the wire reinforcement such as shown in FIG. 8. Thereafter, the hose is completed in the manner specified above. This permits the helical or annular reinforcements to be positioned in various locations on the hose depending upon the use to which the hose is to be formed so as to proivde the required flexibility in the hose without detracting from the strength of the reinforced hose wall.

While the formation of the hose has been described in connection with two mold cavities having different corrugated wall surfaces so as to produce the surface on the partially cured hose and the hose body, it is to be understood that this can be accomplished in a single mold having a cavity provided with a corrugated wall and wherein insert means or a filler are provided in the troughs of the corrugations during the first molding operation to form the reinforcement-receiving portion. As shown in FIG. 11, the insert or filler comprises a helical member 35 having a flattened inner portion 36 which member is removed after the first molding operation to permit the second molding operation to be performed in the same mold to produce the final shape of the corrugations.

The method of the present invention lends itself well to the formation of reinforced hose wherein two types of elastomeric material may be required. For example, the hose may be made with the inner portion being of a material to withstand action of the fluid passing therethrough while the outer surface can be made of such material as to withstand abrasion or other possible damage which may occur in the use thereof.

The novel mandrel and mold structure of the present invention permit a corrugated hose having different composite wall structures to be readily molded so as to provide the required reinforcement, flexibility and wear properties.

While the present invention lends itself to the formation of a plurality of hose units on an elongate mandrel disposed in a multi-cavity mold and thereafter severed into separate units as disclosed in U.S. Patent No. 2,780,273, it is herein illustrated for the purpose of simplicity as forming a single unit.

Variations and modifications may be made within the scope of the claims and portions of the improvements may be used without others.

We claim:

1. The method of forming a reinforced corrugated hose comprising molding an elastomeric body to form a self-sustaining inner hose member having a corrugated portion and shaping the crests of the corrugations to provide reinforcement-receiving portions, removing the body from the mold, locating a wire reinforcement on each reinforcement-receiving portion, applying a cover over said reinforcement to form an assembly, and molding said assembly into a completed hose having the corrugated portion provided with uniformly curved crests and uniformly curved troughs thereon.

2. The method of forming a reinforced corrugated hose comprising molding an elastomeric body to form an inner corrugated hose member having a corrugated portion provided with reinforcement-receiving portions to form a self-sustaining body, removing the body from the mold, locating a reinforcement on each reinforcement-receiving portion, applying an outer cover of elastomeric material different from but compatible with the body to extend over the self-sustaining body and reinforcement to form an assembly. molding said assembly into a completed hose having the corrugations provided with uniformly curved crests and uniformly formed troughs thereon, and setting the hose in final shape.

3. The method of forming a reinforced corrugated hose comprising molding in a first mold cavity an elastomeric body having a corrugated portion with the corrugations provided with reinforcement-receiving portions, partially curing the molded body to form a self-sustaining body, removing the body from the mold, locating a reinforcement on each reinforcement-receiving portion, applying a cover over said reinforcement to form an assembly and molding said assembly in a second mold cavity to complete the corrugations on the corrugated portion to provide uniformly shaped crests and uniformly shaped troughs thereon, and setting the thus molded assembly in final shape.

4. The method of forming a reinforced corrugated hose comprising locating and molding an elastomeric body in a first mold cavity having a corrugated wall portion provided with means for forming the body with corrugations, providing the crests of said corrugations with reinforcement-receiving portions on the surface thereof, partially curing the molded body to form a self-sustaining body, removing the body from the mold, locating a reinforcement on each reinforcement-receiving portion, applying a cover over said reinforcement to form an assembly, locating and molding said assembly in a second mold cavity to complete the corrugations to provide uniformly curved crests thereon and to embed the reinforcement in the body, and setting the thus molded assembly in final shape.

5. The method of forming a reinforced corrugated hose comprising the steps of positioning a tubular body of elastomeric material in a mold cavity having transversely corrugated walls with a removable filler disposed in the troughs of the corrugations of said wall, applying fluid pressure to the interior of the body to press the body against the walls of the cavity and mold a hose having a corrugated portion with the filler in the mold cavity forming reinforcement-receiving portions on the crests of the corrugations of the molded body, partially curing the molded body to form a self-sustaining body, removing the body and filler from the mold cavity, locating a reinforcement on each reinforcement-receiving portions, applying a cover over said reinforcements to form an assembly, thereafter molding said assembly in said mold cavity to mold a finished hose having completed corrugated portions provided with uniformly curved crests and uniformly curved troughs thereon, and setting the hose in final shape.

6. The method of forming a helically corrugated reinforced hose comprising the steps of positioning a tubular body of elastomeric material in a mold cavity having a helically corrugated wall with a removable helical filler disposed in the troughs of the corrugations of said wall and having an inwardly facing flattened portion, applying fluid pressure to the interior of the body to press the body against the walls of the cavity to form a hose having a corrugated portion with the flattened portions of the filler in the mold forming reinforcement-receiving portions on the crests of the corrugations of the molded body, partially curing the molded body to form a self-sustaining body, removing the body and filler from the molding cavity, locating a reinforcement comprising a helical wire spring on said reinforcement-receiving portions, applying a cover over said reinforcement to form an assembly, and thereafter molding said assembly in said mold cavity to form a finished hose having completed corrugations provided with uniformly curved crests and uniformly curved troughs thereon, and setting the hose in final shape.

7. The method of forming a reinforced corrugated hose comprising positioning an elastomeric body on a mandrel having a locating means thereon cooperating with a mold to properly locate the mandrel in a cavity therein having corrugated wall portions with the troughs of the corrugations flattened and having a rib thereon, inserting the mandrel in proper location in the mold and molding a corrugated hose having a corrugated portion with the corrugations thereof provided with a flattened reinforcement-receiving portion having a groove in a precise position therein, partially curing the molded body to form a self-sustaining body, removing the body from the mold, locating a reinforcement in said reinforcement-receiving groove, applying a cover over said reinforcement to form an assembly, inserting and properly locating said mandrel and assembly thereon in a second mold cavity and molding the assembly to embed the reinforcement in the wall thereof and complete the corrugations on the corrugated portion and form a hose provided with uniformly curved crests and uniformly curved troughs thereon, and setting the hose in final shape.

8. The method of forming a reinforced corrugated hose comprising positioning an elastomeric body on a mandrel having a locating means thereon cooperating with the mold to properly locate the mandrel in a cavity therein having corrugated walls with the troughs of the corrugations shaped to form reinforcement-receiving portions, inserting the mandrel in proper location in the mold and molding a corrugated hose having a corrugated portion with the corrugations modified on the crests thereof to provide reinforcement-receiving portions in precise positions thereon, partially curing the molded body to form a self-sustaining body, removing the body from the mold, locating a wire reinforcement on each reinforcement-receiving portion, applying a cover over said reinforcement to form an assembly, inserting and properly locating said mandrel and assembly thereon in a second mold cavity and molding the assembly to complete the corrugations on the corrugated portion and form a hose provided with uniformly curved crests and uniformly curved troughs thereon, and setting the hose in final shape.

9. The method of forming a reinforced corrugated hose comprising positioning an elastomeric body on a mandrel having a locating means thereon cooperating with the mold to properly locate the mandrel in a cavity of the mold, said cavity being provided with cylindrical walls at the ends thereof to form cylindrical attaching end portions of the hose and transversely extending corrugations extending therebetween and having the troughs of the corrugations shaped to form continuations of said cylindrical end portions, inserting the mandrel in proper location in the mold, inflating and pressing the body into engagement with the walls of the cavity and molding a hose having a corrugated portion with the cylindrical crests of the corrugations providing reinforcement-receiving portions, partially curing the molded body to form a self-sustaining body, removing the body from the mold, locating a wire reinforcement on each reinforcement-receiving portion, applying a cover over said reinforcement to form an assembly, inserting and properly locating said mandrel and assembly thereon in a second mold cavity having corrugated walls corresponding to the walls of the first mold and with the troughs forming uniform arcs, inflating the body in the mold to complete the corrugations on the corrugated portion to form a hose having uniformly curved crests and uniformly curved troughs thereon, and setting the hose in final shape.

10. The method of forming a reinforced corrugated hose comprising positioning an elastomeric body on a mandrel having a locating means thereon cooperating with a mold to properly locate the mandrel in a cavity provided with cylindrical walls at the ends thereof to form cylindrical attaching end portions of the hose and transversely extending corrugations extending therebetween and having the troughs of the corrugations shaped to form continuations of said cylindrical end portions and with a centrally projecting rib, inserting the mandrel in proper location in the mold, inflating and pressing the body into engagement with the walls of the cavity and molding a hose having a corrugated portion with the cylindrical crests of the corrugations providing reinforcement-receiving portions having a groove therein, partially curing the molded body to form a self-sustaining body, removing the body from the mold, locating a reinforcement in the groove on each reinforcement-receiving portion, applying a cover over said reinforcement to form an assembly, inserting and properly locating said mandrel and assembly thereon in a second mold cavity having corrugated walls corresponding to the walls of the first mold and with the troughs forming uniform arcs, inflating the body in the mold to embed the reinforcement and complete the corrugations on the corrugated portion to form a hose having uniformly curved crests and uniformly curved troughs thereon, and setting the hose in final shape.

11. An apparatus for forming a reinforced corrugated hose comprising a mandrel having locating means thereon cooperating with a mold to properly locate the mandrel in a cavity therein, said mandrel being provided with a cylindrical surface to receive a tubular elastomeric body, a central bore, and transversely extending passages from the bore to the cylindrical surface, the walls of the cavity in said mold having cylindrical end portions and corrugations therebetween with the portions between the corrugations forming troughs shaped to form continuations of said cylindrical end portions to enable the body on the mandrel when inflated and pressed into engagement with the walls of the cavity to form a partially constructed hose having a corrugated portion with the cylindrical crests of the corrugations providing reinforcement-receiving portions, said locating means on the mandrel properly locating the mandrel having the partially constructed hose having reinforcing means and cover means thereon in a second mold cavity having corrugated walls corresponding to the walls of the first mold and with the troughs of the corrugations of the wall forming uniform arcs to complete the corrugated portion of the hose with uniformly curved crests and troughs thereon.

12. The invention as defined in claim 11 wherein the trough portions between the corrugations on the wall of the cavity are provided with a shallow rib for forming a groove in the reinforcement-receiving portion of the hose for the reception of the reinforcement therein.

13. An apparatus for forming a corrugated hose comprising a mandrel having a locating means thereon cooperating with a mold to properly locate the mandrel in a cavity therein, said mandrel being provided with a cylindrical surface to receive a tubular elastomeric body, a central bore, and transversely extending passages from the bore to the surface, the walls of the cavity in said mold having cylindrical end portions and corrugations therebetween, said corrugations having uniform arcs at the crests and troughs thereof, removable insert means disposed in the troughs of the corrugations and adapted to form reinforcement-receiving portions on the crests of the corrugations on the tubular body when the body is inflated and pressed into engagement with the walls of the cavity to form a partially constructed hose, the removal of said insert means enabling the location of the mandrel having the partially constructed hose having reinforcing means and cover means thereon in said mold cavity with the corrugated walls of the hose in proper relation to the corrugated wall of the mold cavity to complete the corrugated portion of the hose with uniformly curved crests and troughs thereon.

References Cited in the file of this patent

UNITED STATES PATENTS

| | | |
|---|---|---|
| 1,324,850 | Roberts | Dec. 16, 1919 |
| 2,073,335 | Connell | Mar. 9, 1937 |
| 2,248,898 | Ross et al. | July 8, 1941 |
| 2,272,704 | Harding | Feb. 10, 1942 |
| 2,273,027 | Dreyer | Feb. 17, 1942 |
| 2,779,976 | Roberts et al. | Feb. 5, 1957 |
| 2,780,272 | Roberts | Feb. 5, 1957 |
| 2,813,573 | Roberts | Nov. 19, 1957 |
| 2,901,024 | Marsden | Aug. 25, 1959 |

FOREIGN PATENTS

| | | |
|---|---|---|
| 934,912 | France | Jan. 19, 1948 |